UNITED STATES PATENT OFFICE.

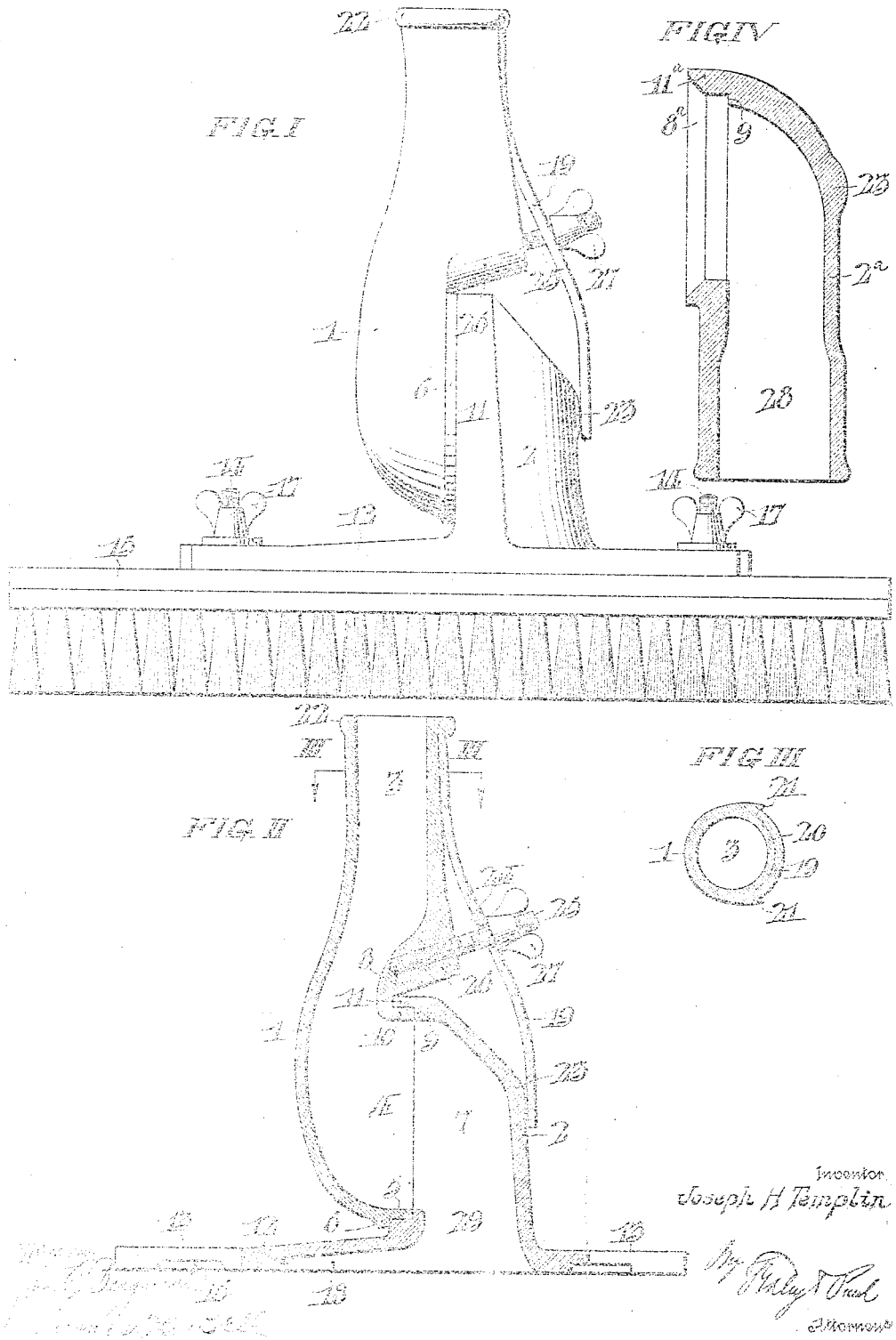

JOSEPH H. TEMPLIN, OF PHILADELPHIA, PENNSYLVANIA, ASSIGNOR, BY MESNE ASSIGNMENTS, TO SANTO MANUFACTURING COMPANY, OF PHILADELPHIA, PENNSYLVANIA, A CORPORATION OF DELAWARE.

RENOVATING-TOOL.

1,149,475.  Specification of Letters Patent.  Patented Aug. 10, 1915.

Application filed January 5, 1912. Serial No. 669,538.

*To all whom it may concern:*

Be it known that I, JOSEPH H. TEMPLIN, of the city and county of Philadelphia and State of Pennsylvania, have invented certain new and useful Improvements in Renovating-Tools, of which the following is a specification, reference being had to the accompanying drawings.

The invention relates to new and useful improvements in renovating tools, and more especially to tools of this character used in connection with pneumatic cleaners.

An object of the invention is to provide a construction of renovating tool wherein a head having a passage therethrough will be efficiently attached to a shank so that the head may be swung in a plane parallel with the longitudinal axis of the shank and yieldingly held in adjusted positions.

This and other objects will in part be obvious, and will in part be hereinafter more fully described.

In the drawings which show by way of illustration, one embodiment of the invention, Figure I, is a view in side elevation, of a tool embodying my improvements. Fig. II, is a sectional view through the tool, the brush and its fastening devices having been removed for the sake of clearness in illustration. Fig. III, is a sectional view on the line III, III, of Fig. II. Fig. IV, is a sectional view showing the swivel connection as applied to a different type of tool.

My improved renovating tool consists generally of a shank 1, and a head 2. The shank 1, is provided with an internal bore or passage 3, which is adapted to receive the hose or other connection which leads to the vacuum cleaner. This passage 3, extends through the shank 1, and is formed with an enlarged inlet 4, at its lower end. The outer periphery of the shank about the passage 4, is faced off or machined, as at 5, thereby forming a shoulder 6. The head 2, is provided with a passage 7, therethrough, which is enlarged to substantially the same diameter as the passage 4, connecting with the bore or passage 3, in the shank. The inner periphery of the head 2, adjacent the passage 7, is internally recessed or machined as indicated at 8, thereby forming a seat 9, so that when the head and shank are in assembled position, the flange 10, of the shank 1, will abut against the seat 9, of the head 2. The flange 11, on the head 2, will also abut against the shoulder 6, of the shank 1.

As shown in Figs. I, and II, the head of the tool is formed with a connecting plate 12, which is provided with slots 13, in the ends thereof, through which suitable bolts 14, are adapted to pass. The bolts 14, are carried by the renovating member 15, which in Fig. I, is shown as consisting of a brush. The under face of the connecting plate 12, is recessed as at 16. Suitable winged nuts 17, are provided for the bolts 14, whereby the renovating head proper is connected to the plate 12. The slot 13, at the left as viewed in Fig. II, is preferably made slightly longer than the slot 13, at the right, which aids in assembling the brush or other cleaning tool on the supporting plate of the head. When the nuts are loosened, the plate 12, may be moved so as to bring the bolt 14, to the bottom or inner end of the long slot 13, which will release the plate at the other end from the securing bolt 14.

The head 2, is provided with a laterally extending passage 18, in order to permit the dust-laden air or other fluid to pass through the passage with a minimum amount of resistance due to the friction against the walls of the passage through the head and shank of the tool. I am aware that prior to my invention, swivel connections have been made wherein the fastening bolt in the connecting of the parts passes directly through the passage for the air, and said bolt obstructs said passage. I have, therefore, provided means for connecting the parts of the swivel joint, which means is located entirely exterior of the passage through the renovating tool. As herein shown, the connecting means consists of a spring 19, one end of which is shaped to conform to the contour of the upper end of the shank 1.

As clearly shown in Figs. I, and III, the shank is formed with a recess 20, which provides side walls 21, against which the sides of the spring 19, are adapted to abut, and the spring is thereby held in proper position relative to the shank. This spring also at its upper end abuts against a head or flange 22, formed around the upper end of the shank. The other end of the spring is deflected in order to engage with a bearing 23, on the head 2, which is formed in the present instance by providing a boss or extension, the outer face of which is suitably rounded or beveled. This boss is preferably positioned in a line passing centrally through the passage connecting the shank and the head, and perpendicularly to the plane of movement of the parts.

The spring 19, is provided with a hole 24, through which passes a screw 25, and said screw is secured in a boss or enlargement 26, formed in the shank 1. A thumb nut 27, engages the outer end of the screw and is adapted to bear on the spring in order to hold the spring in place. By adjusting the screw, the pressure of the lower end of the spring against the bearing 23, may be varied. It will be apparent that by this construction, the head of the renovating tool may be swung about its swivel joint connection with the shank, and will be held in various adjusted positions, through the friction between the parts caused by the spring pressing upon the bearing 23.

In the form of my invention illustrated in Fig. IV, the supporting plate is omitted and the renovating head 2ª is formed with an internal bore 28. The head is provided with a flange 11ª, which is tapered as at 8ª and adapted to receive a hose or other connection in a manner well known in this art.

From the above description, it will be apparent that I have provided a swivel connection for a renovating tool, which has a passage therethrough for the fluid or dust-laden air, which is entirely unobstructed, so that there is no liability of the dust or dirt, or foreign material, collecting within the passage.

It will be obvious that minor changes in the details of construction and the arrangement of parts may be made, without departing from the spirit of my invention, as set forth in the appended claims.

Having thus described my invention, I claim:

1. A renovating tool including in combination a renovating member, a head attached to said renovating member and having a passage therethrough, a shank attached to said head and having a passage extending therethrough registering with the passage in said head, and means for attaching said shank to said head whereby said renovating member and head may be swung in a plane parallel with the longitudinal axis of said shank, said means including a yielding device located exterior of said head and shank for yieldingly holding said head and shank in engagement with each other.

2. A renovating tool including in combination a renovating member, a head attached to said renovating member and having a passage therethrough, a shank attached to said head and having a passage extending therethrough registering with the passage in said head, and means for attaching said shank to said head whereby said renovating member and head may be swung in a plane parallel with the longitudinal axis of said shank, said means including a spring carried by the shank and adapted to engage the head for yieldingly holding said shank and head in engagement with each other.

3. A renovating tool including in combination a renovating member, a head rigidly attached thereto and having a passage therethrough, said head having a bearing seat on one side face thereof and a projecting bearing boss on the other side thereof, a shank having a passage extending therethrough, said shank having a bearing face at one side thereof adapted to engage the bearing face on the head, whereby the passage in the shank will register with the passage in said head, a bearing spring engaging said shank and adapted to be pressed against said bearing boss for holding said shank and said head in engagement with each other, a threaded bolt attached to said shank and extending through said spring, and a nut threaded on said bolt and bearing against said spring for varying the tension of the spring on the bearing boss.

In testimony whereof, I have hereunto signed my name at Philadelphia, Pennsylvania, this third day of January 1912.

JOSEPH H. TEMPLIN.

Witnesses:
JAMES H. BELL,
E. L. FULLERTON.